US005535621A

United States Patent [19]

Glidewell et al.

[11] Patent Number: 5,535,621

[45] Date of Patent: *Jul. 16, 1996

[54] ON-BOARD DETECTION OF FUEL INJECTOR MALFUNCTION

[75] Inventors: John M. Glidewell, Dearborn; Granger K.-C. Chui, Dearborn Heights; Woong-Chul Yang, Ann Arbor, all of Mich.

[73] Assignee: Ford Motor Company, Dearborn, Mich.

[ * ] Notice: The term of this patent shall not extend beyond the expiration date of Pat. No. 5,445,190.

[21] Appl. No.: 204,823

[22] Filed: Mar. 2, 1994

[51] Int. Cl.$^6$ .......................... G01M 15/00; F02M 65/00

[52] U.S. Cl. .......................... 73/119 A; 123/478

[58] Field of Search .......................... 73/119 A, 117.2, 73/117.3, 119 R, 47, 49.7; 123/478, 479, 480, 483, 484, 485

[56] References Cited

U.S. PATENT DOCUMENTS

| | | | |
|---|---|---|---|
| 3,919,885 | 11/1975 | Kaireit | 73/119 A |
| 4,179,939 | 12/1979 | Price | 73/119 A |
| 4,257,260 | 3/1981 | Beatson et al. . | |
| 4,261,209 | 4/1981 | Hatsuno et al. | 73/119 A |
| 4,696,275 | 9/1987 | Kushi et al. | 123/478 |
| 4,775,816 | 10/1988 | White et al. | 73/119 A |
| 4,791,810 | 12/1988 | Old et al. . | |
| 4,899,713 | 2/1990 | Nakamura | 123/478 |
| 4,930,482 | 6/1990 | Kako | 123/478 |
| 4,977,872 | 12/1990 | Hartopp . | |
| 5,020,362 | 6/1991 | Hart et al. . | |
| 5,058,547 | 10/1991 | Morikawa . | |
| 5,211,150 | 5/1993 | Anzai | 123/480 |
| 5,218,941 | 6/1993 | Suzuki et al. . | |
| 5,351,548 | 10/1994 | Briggs et al. | 73/119 A |
| 5,426,971 | 6/1995 | Glidewell et al. | 73/19.05 |

FOREIGN PATENT DOCUMENTS

| | | |
|---|---|---|
| 0501459 | 9/1992 | European Pat. Off. . |
| 57-20553 | 2/1982 | Japan . |
| 588263 | 1/1983 | Japan . |
| 58-8263 | 1/1983 | Japan . |
| 3143383 | 6/1988 | Japan . |
| 3150463 | 6/1988 | Japan . |
| 1389408 | 4/1975 | United Kingdom . |
| 2086080 | 5/1982 | United Kingdom . |
| 2245382 | 1/1992 | United Kingdom . |
| 2277386 | 10/1994 | United Kingdom . |

OTHER PUBLICATIONS

*Dynamic Modeling and Analysis of Automotive Multi-port Electronic Fuel Delivery System;* Yang et al., 143–151, Mar. 1991.

*Primary Examiner*—Richard Chilcot
*Assistant Examiner*—Eric S. McCall
*Attorney, Agent, or Firm*—Peter Abolins; Roger L. May

[57] ABSTRACT

The present invention is directed to an on-board diagnostic system for detecting malfunctioning fuel injectors in an internal combustion engine during engine operation. A fuel injector control means is provided for individually actuating fuel injectors operatively connected to a fuel rail. Pressure sensor means are mounted to the fuel rail for sensing transient fuel pressure waves resulting from actuation of the individual fuel injectors and for generating a pressure signal in response thereto. Signal processing means are provided for processing pressure signals from the pressure sensor means and for generating an output signal upon detecting delayed opening or delayed closing of one or more injectors. Utilization means responsive to the output signal from the signal processing means may include, for example, an indicator lamp to alert an engine operator to an impaired fuel injector and/or means for adjusting the timing or duration of the injector actuation signal to achieve the desired injector opening and closing times.

17 Claims, 3 Drawing Sheets

ON-BOARD DETECTION OF FUEL INJECTOR MALFUNCTION

INTRODUCTION

The present invention is directed to a diagnostic system for an internal combustion engine to detect fuel injector malfunction. More specifically, the invention is directed to an on-board diagnostic system for detecting malfunctioning fuel injectors during engine operation.

BACKGROUND OF THE INVENTION

It is becoming increasingly desirable to provide onboard diagnostic means for certain components of an internal combustion engine, especially those which have a significant impact on critical engine performance criteria. This is particularly true in the motor vehicle industry, where high precision in the control of fuel flow has become essential to various present and planned engine management features designed to meet increasingly strict emissions, performance, drivability, and maintenance objectives. It is now well known how to adjust the fuel flow to the cylinders of an engine to maintain a desired fuel/air mixture ratio for meeting engine emission requirements by electronically controlling the actuation timing and duration of the engine's fuel injectors. Electronic fuel injector controls are presently available and in use, generally being incorporated into electronic engine control (EEC) modules performing a variety of engine control functions. In accordance with such known systems, the timing of injector actuation is controlled by the timing of the corresponding actuation signal sent by the control module. The duration of injector actuation, during which fuel is passed through the injector from a fuel rail or like fuel supply means, is controlled by the duration of the actuation signal from the control module, that is, by the pulse width of the signal.

Reliably controlling a fuel injector's fuel supply by controlling its actuation signal timing and pulse width requires that the fuel injector be performing properly. A fuel injector's performance may deteriorate, however, over a period of use, potentially resulting in decreased engine efficiency, increased emission of undesirable combustion products, etc. A defective injector spring or a malfunctioning electromagnetic solenoid in the injector, for example, may change the response of the injector to a given actuation signal, specifically, the timing of the injector opening and/or closing events. Thus, in support of maintaining the efficacy of electronic engine management devices adapted to control fuel flow by controlling the actuation of fuel injectors, it would be desirable to provide means for detecting malfunctioning fuel injectors. It is an object of the present invention to provide such means for detecting malfunctioning injectors and, in particular, it is an object of the invention to provide an on-board diagnostic system to periodically test an engine's fuel injectors during engine operation without requiring disassembly of the engine. Additional objects and features of various embodiments of the invention will be apparent from the following disclosure.

SUMMARY OF THE INVENTION

A properly running engine having a diagnostic system as herein disclosed will have a characteristic fuel line pressure wave pattern for a given segment of an engine cycle, at a given point along the fuel line, under given engine operating conditions. The pressure wave pattern will include, at various frequency ranges, fuel line pressure transients resulting from fuel injector actuations, fuel pump operation, noise, etc. The on-board diagnostic system of the present invention employs analysis of fuel line pressure transients initiated by fuel injector actuation. It should be understood that reference herein to actuation of a fuel injector for a controlled actuation period is meant to include the deactuation of the fuel injector at the end of that time period. It has been found that such analysis of fuel pressure transients acquired by a pressure transducer mounted to a fuel supply line of the engine, preferably on the fuel rail, can accurately detect or diagnose malfunctions of individual fuel injectors spaced along the fuel rail. In particular, the on-board diagnosis system can be employed to detect delayed opening of a fuel injector in response to commencement of an injector actuation signal to the injector. It also can be employed to detect delayed closing of the injector in response to termination of the actuation signal. It is known that fuel injector actuation creates an hydraulic hammer effect which manifests as a sudden pressure drop in the fuel rail followed by a low pressure period ending with a sudden pressure rise. The pressure signal from a pressure transducer as described above would track such waveform. Signal processing means to process such pressure wave signals within a defined time period, e.g., a selected portion of an engine cycle or multiple engine cycles. Optionally, an ensemble average of waveforms is processed, acquired over multiple engine cycles. By processing an average of waveforms, where signals are added and the sum divided by the number of acquisitions, asynchronous noise in the fuel system can be minimized, since totally random noise in the system has a mean value of approximately zero.

In accordance with certain preferred embodiments discussed in more detail below, the diagnostic system may comprise means for advancing the actuation signal upon detecting delayed opening or closing of the injector. As discussed in detail below, reference herein to advancing the fuel injector actuation signal means commencing the actuation signal sooner in the engine cycle and/or terminating the actuation signal sooner in the cycle to overcome delayed opening and/or closing, as the case may be. Thus, advancing the signal may or may not change the pulse width of the signal.

In accordance with one aspect, an internal combustion engine is provided with an on-board diagnostic system comprising fuel supply means for supplying liquid fuel under pressure to the combustion cylinders of the engine, including at least one (and generally a plurality of) fuel injectors operatively connected to a fuel rail. Fuel injector control means are provided for individually actuating the fuel injectors to pass fuel from the fuel rail during a controlled actuation period. Pressure sensor means senses transient fuel pressure waves in the fuel rail resulting from actuation of the fuel injectors, and generates a corresponding pressure signal which varies with the pressure sensed. The pressure sensor means may employ a pressure transducer comprising, for example, a pressure responsive diaphragm exposed to fuel in the fuel rail and a signal conditioner to generate a continuous analog voltage output signal. The measurable fuel rail pressure transients resulting from actuation of each individual fuel injector reliably correspond to fuel injector opening and closing. In fact, the present invention represents a significant advance in electronic engine control in part for its use of the correspondence of such measurable transient fuel pressure waves in the fuel rail, especially low-frequency pressure waves, to the opening and closing of a fuel injector during its actuation, i.e., for its presently disclosed means and method of detecting fuel injector malfunction during engine operation using such transient fuel pressure waves.

Signal processing means are provided for processing the pressure signals from the pressure sensor means to detect delay in injector actuation timing, meaning the opening and/or closing time of the injector in the engine cycle, and for generating an output signal in response thereto. The signal processing means preferably develop an average pressure signal corresponding to actuation of a given injector. The on-board diagnostic system further comprises utilization means operatively connected to the signal processing means for receiving the output signal and manifesting its presence, e.g., by storing an indicator code accessible to a service technician, by illuminating an indicator lamp and/or by advancing the actuation signal for the injector in question.

As noted above, injector malfunction can significantly degrade the control of exhaust emissions, engine performance, etc. Hence, the detection of injector malfunction by the on-board diagnostic system of this invention, which is able to carry out such detection during running of the engine, can help control exhaust emissions and engine performance, and can be employed in an adaptive strategy to manage fuel flow in the engine. It should be understood that reference herein to pressure signal processing during ongoing engine operation is intended to mean not only routine on-road operation, but also test operation, e.g., immediately following initial engine or vehicle assembly. Thus, the on-board diagnostic system could be used, optionally, while the engine is running without fuel ignition. In fact, a test liquid in place of gasoline or other fuel could be used, such as stoddard solvent which would, like liquid fuel, give a predictable fuel line pressure wave signal as the engine is cycled. These and other features and advantages of the present invention will be better understood in view of the following detailed description of certain preferred embodiments.

BRIEF DESCRIPTION OF THE DRAWINGS

Certain preferred embodiments are described below with reference to the appended drawings, in which:

FIG. 1A shows the pressure transient for an injector with delayed opening and closing. FIG. 1B shows the pressure transient for a properly operating fuel injector;

DETAILED DESCRIPTION OF CERTAIN PREFERRED EMBODIMENTS

While the present invention is applicable generally to any internal combustion engine burning liquid fuel supplied to fuel injectors via a fuel rail, it is particularly advantageous for gasoline burning multi-cylinder engines, especially motor vehicle engines. Accordingly, without intending to limit the scope of the invention, the discussion below will focus primarily on four stroke multi-cylinder motor vehicle engines. In that regard, reference in this discussion to an engine cycle or to a complete engine cycle (of a four stroke engine) is intended to mean two full revolutions of the engine. In a four stroke engine, each cylinder fires once during two full revolutions. Thus, one complete engine cycle means that each cylinder fires once.

The present invention addresses the aforesaid diagnostic need by providing an on-board diagnostic system for detecting impaired fuel injectors. Fuel injector malfunction can occur through normal engine use due to a defective spring or a malfunctioning electromagnetic solenoid in the injector, for example. This will change the timing of injector actuation, i.e., of the injector opening and/or closing events in response to an actuation signal. This will, in turn, cause a change in the width of the hydraulic hammer and/or a shift in the phase of the pressure signal, further discussed below. Such changes are substantially synchronous with injector actuation. The on-board diagnostic system of the invention detects in a running engine such actuation delays by a malfunctioning injector. Preferred embodiments of the on-board diagnostic system of the invention can identify specific impaired injectors, thus avoiding the need to replace the engine's complete set of fuel injectors and/or facilitating remedial action by adaptive fuel injector control means to achieve desired fuel flow timing with each injector actuation. As to the latter, in certain embodiments of the invention, the on-board diagnostic system is integrated with adaptive air/fuel control means. In accordance with such embodiments the air/fuel control means can employ the output signal from the signal processing means indicating the amount of actuation delay, as an input value for advancing injector actuation signal timing and/or duration. More specifically, an output signal from the on-board diagnostic system can serve as an input signal to the electronic engine control (EEC) for adaptive air/fuel control to enable the EEC computer to advance the injector actuation signal to compensate for delayed actuation of a malfunctioning injector.

Figure 1:
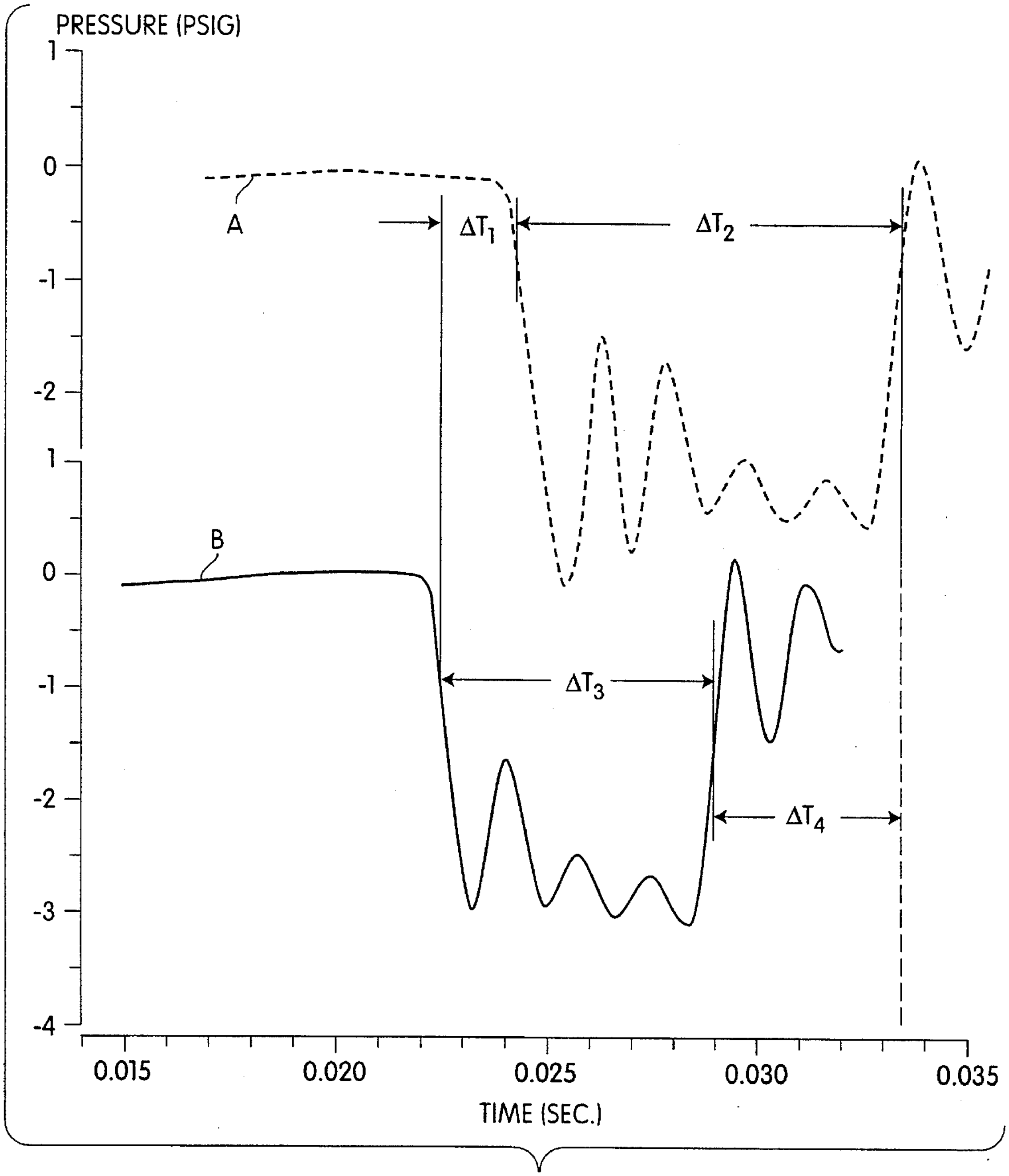
FIGS. 1A and 1B are graphs illustrating the wave form of output signals generated by a pressure sensor, expressed in pressure as a function of time, showing transient fuel pressure waves in a fuel rail resulting from actuation of a fuel injector.

The two graphs in FIG. 1 show pulse waveforms, that is, the output signal from a pressure transducer sensing fuel rail pressure for delayed actuation and for non-delayed actuation of a fuel injector. The graph plots fuel pressure at a pressure transducer mounted to a fuel rail as a function of time. The pulse waveforms were obtained using a pressure transducer having a variable voltage output signal proportional to pressure within the fuel rail. Given an actuation commencing at time 0.00 on the graph, pressure in the fuel rail drops at the location of the pressure transducer in response to such actuation after a wave propagation delay period. The output voltage of the pressure transducer drops correspondingly. Pressure then recovers after the actuation, that is, after the fuel injector is closed. The aforesaid wave propagation delay period from a given injector to a pressure transducer mounted at a given location is substantially constant. It can be measured empirically for each injector in a given engine arrangement or can be accurately determined by modelling in accordance with known techniques.

As seen in FIGS. 1A and 1B, injector actuation creates an hydraulic hammer effect which manifests as a sudden pressure drop in the fuel rail followed by a low pressure period ending with a sudden pressure rise. The waveform of FIG. 1B is a normal waveform from the pressure transient resulting from non-delayed actuation of an injector for 7 ms. The pressure signal from a pressure transducer as described above would track the waveform. The waveform of FIG. 1A is also a pressure transient resulting from actuation of the injector for 7 ms, where both the injector opening and closing events were delayed due to mechanical sticking of the injector apparatus. Clogging of the injector orifice without sticking is not found to change the phase of the pressure transient, although it changes the amplitude of the hydraulic hammer. The delay in opening, shown as $\Delta T_1$ can be seen to be about 1.7 ms. The delayed opening would not affect the time at which the actuation signal ended. Thus, a delayed opening with no other injector malfunction would result in an actual actuation period which starts late and has foreshortened duration. As discussed further below, these effects can be overcome by initiating the actuation early without changing the time at which the actuation signal is ended. Specifically, if $\Delta T_1$ is greater than zero or other preselected value, the actuation signal in subsequent engine cycles can be advanced in this way an amount equal to $\Delta T_1$.

In FIG. 1B the normal 7 ms. pulse width of the actuation signal is seen to produce a waveform having a corresponding duration $\Delta T_3$ of about 7 ms. In the waveform of FIG. 1A, malfunction of the injector results in a waveform having a duration $\Delta T_2$ which exceeds $\Delta T_3$. The delay in closing, shown as $\Delta T_4$, is about 4.3 ms. Given that $\Delta T_1$ is small or zero, the pulse width can be corrected if $\Delta T_2$ is greater than $\Delta T_3$ by advancing the time at which the actuation signal ends. Those skilled in the art will recognize that suitable techniques are known for determining the amount of correction based on the magnitude of $\Delta T_4$ and/or on the difference between $\Delta_2$ and $\Delta T_3$, taking into account the value of $\Delta T_1$ the correction amount can be sent as an input signal to the fuel control means.

The sudden pressure drop can be detected by the signal processing means, for example, as a pressure signal corresponding to a preselected pressure drop of at least about 1 to 3 PSI or other value found to be characteristic of the hydraulic hammer effect created by actuation of the injector in question. Since the wave propagation delay period is substantially constant for an injector (although varying from one injector to the next, based primarily on distance along the fuel rail from the injector to the pressure transducer), the signal processing means can readily be adapted to process pressure wave signals within a short time window spanning the predicted arrival time of the initial pressure drop corresponding to opening of a particular injector. Typically, for example, for a six cylinder engine operating at 2000 rpm, with each injector being actuated for 2.5 ms within a 10 ms interval, a window of 0.5 ms to 5 ms spanning the expected arrival time of the pressure drop (i.e., at expiration of the wave propagation delay period) is sufficient. In general, the time interval over which the pressure signal is analyzed for the pressure drop characteristic of injector opening, that is, the pressure drop time window, should be sufficiently large to cover the arrival of the fuel pressure transient at the pressure transducer either with or without slowing due to fuel line vapor, etc. Preferably, an ensemble average of waveforms is processed, acquired over multiple engine cycles. By processing an average of waveforms, where signals are added and the sum divided by the number of acquisitions, pressure transients generated in the fuel system at cycle intervals different from the injection event (i.e., asynchronous noise), such as those caused by unsteady fuel delivery from the pump, can be minimized. Totally random noise in the system has a mean value of approximately zero.

Certain embodiments of the on-board diagnostic system determine actuation delay quantitatively, while other embodiments determine simply that actuation delay is occurring in any amount or in an amount above a selected threshold value. In accordance with certain embodiments, the wave propagation delay period for each injector is stored, preferably in ROM memory of an EEC module or the like. Substantially concurrent with the actuation signal for each injector in turn, the fuel injector actuation means generates a timing signal to the signal processor to begin acquisition or processing of the pressure signal in the aforesaid pressure drop time window spanning expiration of the wave propagation delay period of the injector in question. In accordance with certain embodiments, to synchronize acquisition of the pressure signal corresponding to the actuation pressure transient caused by actuation of a given injector, analyzer triggering (that is, the point in time taken as zero for measuring the propagation wave delay period of that injector) preferably is set to a fixed current shunt voltage (e.g., +80 mv) of the injector at the EEC or other fuel injector control means.

The same approach applies to detecting delay in the injector closing event. The sudden pressure rise at the end of the hydraulic hammer shown in the graphs of FIG. 1A and 1B can be detected by the signal processing means, for example, as a pressure signal corresponding to a preselected pressure rise of at least about 1 to 3 PSI or other characteristic value for the injector in question. Optionally, the preselected pressure rise can be set as the point at which the pressure approaches within, for example, 0.5 to 1 PSI of the normal, non-actuation pressure (shown as zero PSI in FIGS. 1A and 1B another alternative embodiment sets the preselected pressure rise as the point at which the pressure passes through such nominal non-actuation pressure. In view of the significant pressure fluctuations during the trough of the hydraulic hammer, especially in its earlier portion, it is preferred to start the signal acquisition period, the pressure rise time window, at least half way through the trough. The wave propagation delay period can be started, for purposes of diagnosing injector closing, based on the timing signal generated by the fuel injector control means to the signal processor means plus the duration of the actuation signal. Alternatively, a separate timing signal can be generated concurrently with termination of the actuation signal, that is, at the end of the actuation pulse width.

Another alternative involves diagnosing erratic injector actuation by measuring and recording for each injector the length of time which passes between commencement (and termination) of its actuation signal and arrival of the characteristic pressure drop signal (and pressure rise signal) for a series of engine cycles. An output signal is generated to the utilization means in the event of significant changes in the value from one engine cycle to the next. Any such significant change would indicate intermittent malfunction, that is, actuation delay. Other alternative timing signal strategies equivalent to those discussed herein will be apparent to those skilled in the art in view of the present disclosure.

As indicated above, the wave propagation delay period may be a stored value. A first stored value (a separate one for each injector) typically will correspond to a non-delayed opening of the injector in the sense that its value is substantially identical to the calculated or empirically determined wave propagation delay period from that injector to the pressure sensor. Any delay detected in injector opening, in the sense of a first actual duration (between actuation signal commencement and the characteristic pressure drop) found to exceed the first stored value, preferably triggers an output signal to illuminate an indicator lamp and/or to actuate other responsive utilization means. Alternatively, the first stored value may correspond to an injector opening which is delayed a certain threshold amount, for example, less than 1.5 ms. In that case, detection of an actual delay exceeding such threshold amount would result in an output signal. In certain preferred embodiments, a detected delay, even if less than such threshold value, results in an output signal to which the fuel control means is responsive by making an appropriate adjustment to the timing and/or duration of the actuation signal for the injector in question. Only if a delay is detected exceeding the threshold amount is a different output signal generated, an above-threshold output signal, distinguishable by the utilization means from the below-threshold output signal. Thus, the fuel control means compensates for even minor injector sticking, while the operator is alerted only to more severe sticking.

To compensate for a delayed injector opening detected by the diagnostic system of this invention, it will be preferred generally to adjust the injector actuation signal by thereafter generating it sooner than it otherwise would be generated. Advancing commencement of the actuation signal will offset the delay in injector opening, resulting in the injector opening in subsequent engine cycles at or near the correct time. If there is no corresponding delay in the closing of the injector, the injector actuation signal should be lengthened (i.e., its pulse width increased) an amount equal to the advancement of its starting time. In this way, the delay in injector opening is overcome without disrupting the timing of injector closing. In addition, if the starting time of the actuation signal is advanced, the corresponding adjustment is made for subsequent diagnosis of the actuation response of that injector. Such corresponding adjustment would in certain preferred embodiments be made by generating the aforesaid timing signal to the signal processor concurrently with the original injector actuation signal start time, that is, still at the point in the engine cycle that the injector actuation signal would be sent for the injector in question if unadjusted to compensate for the delayed opening. In this way, the first stored value may continue to be compared to the first actual time duration to diagnose for injector opening delay in subsequent engine cycles. In view of the present disclosure, however, various alternatives will be apparent to those skilled in the art for taking into account the advanced (i.e., early) generation of the injector actuation signal. Such alternatives include, for example, increasing the first stored value, preferably in response to an appropriate output signal from the signal processing means, an amount equal to the amount by which the timing of the injector actuation signal is advanced. Reference herein to the first stored value corresponding to a non-delayed opening of the injector is intended to cover all such options and variations. Likewise, reference to the second stored value corresponding to a non-delayed closing of the injector is intended to have comparable breadth of meaning. Reference herein to the output signal generated in response to diagnosis of delayed injector opening, sometimes being referred to as a first output signal, is intended to cover any and all of the aforesaid options, including, but not being limited to, the above-discussed below-threshold output signal, the above-threshold output signal, and adjusting signal to increase the first stored value, etc. Reference to the output signal generated in response to diagnosis of delayed injector closing, [sometimes being referred to as], a second output signal, is intended to cover comparable options, including, for example, above- and below-threshold output signals and/or an adjusting signal to increase the second stored value.

From the foregoing detailed discussion of the manner in which delayed injector opening is diagnosed and responded to in accordance with various embodiments of the invention, those skilled in the art will understand equally well the corresponding manner in which delayed injector closing is diagnosed and responded to in accordance with such embodiments.

Figure 2:
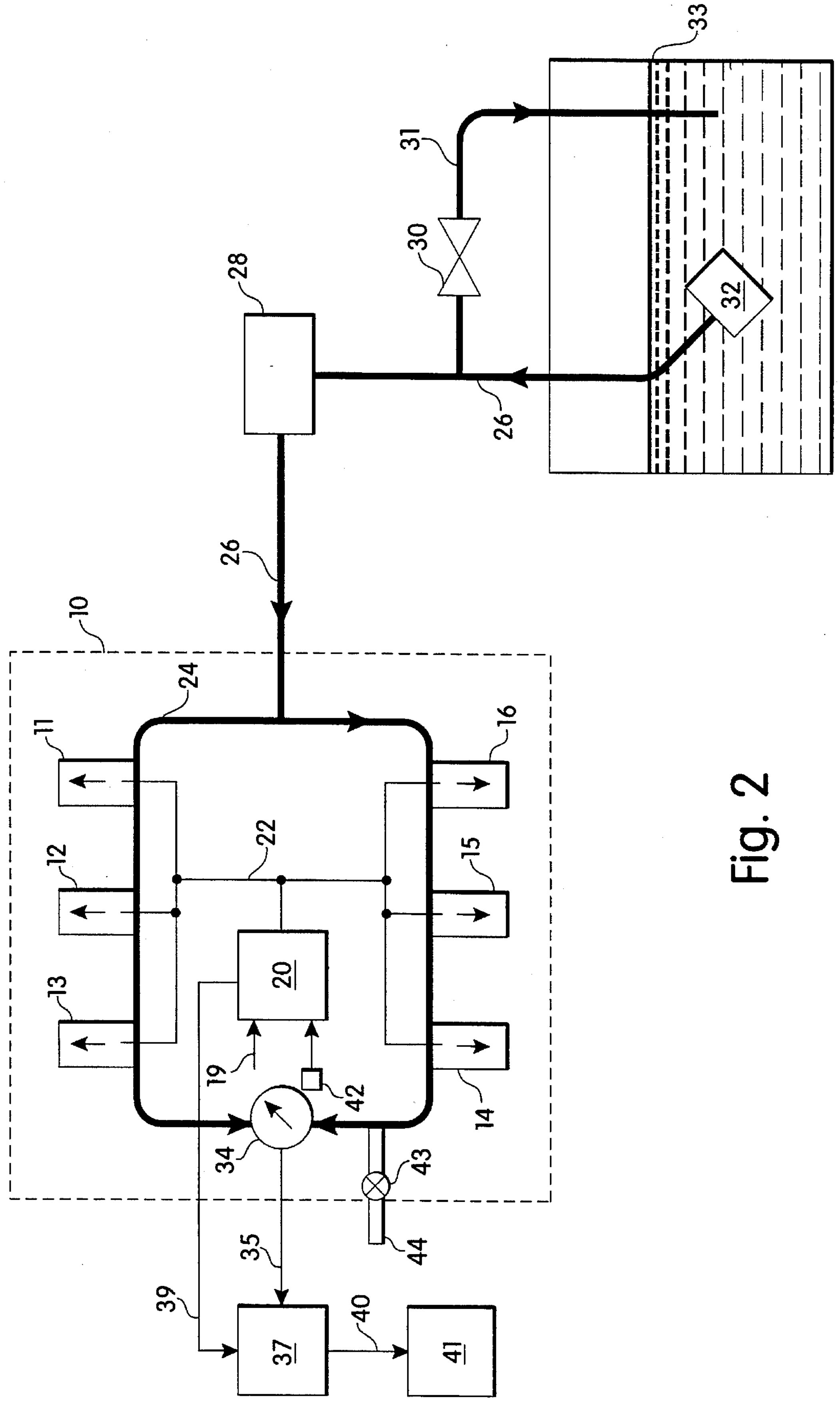
FIG. 2 is a schematic illustration of an internal combustion engine fuel system comprising an on-board diagnostic system for detecting fuel injector malfunction during engine operation in accordance with a first embodiment of the invention.

A first preferred embodiment of the invention is illustrated in FIG. 2, wherein a six cylinder engine 10 is seen to comprise a fuel supply system for supplying gasoline under pressure to the combustion cylinders of the engine. The fuel supply system consists of high pressure electric Gerotor-type pump 32 delivering fuel from a storage tank 33 through an inline fuel filter 28 to a fuel charging manifold assembly 24 via solid and flexible fuel lines. The fuel charging manifold assembly, commonly referred to as a fuel rail, supplies fuel to electronically actuated fuel injectors 11–16 mounted on an air intake manifold directly above each of the engine's intake valves. Air entering the engine is measured by a mass airflow meter. Air flow information and input from other engine sensors 19 is used by an onboard engine electronic control computer 20 to calculate the required fuel flow rate necessary to maintain a prescribed air/fuel ratio for a given engine operation. The injectors, when energized, spray a predetermined quantity of fuel into the intake air stream. The duration of the actuation period during which the injectors are energized, determined by the actuation signal pulse width (except in the case of delayed injector opening or closing due to malfunction), is controlled by the vehicle's EEC computer 20. Thus, the EEC computer serves as the fuel injector control means, and, typically, performs various additional engine control functions.

The fuel injector is an electromechanical device that atomizes the fuel delivered to the engine. Injectors typically are positioned so that their tips direct fuel at the engine intake valves. The valve body consists of a solenoid actuated pintle or needle valve assembly that sits on a fixed size orifice. A constant pressure drop is maintained across the injector nozzles via a pressure regulator. An electrical signal, the injector actuation signal, from the EEC unit activates the solenoid, causing the pintle to move inward, off the seat, allowing fuel to flow through the orifice. Thus, the six fuel injectors 11 through 16 each includes a nozzle assembly and driver assembly responsive to an actuation signal from the fuel injector control means.

In the embodiment of FIG. 2, fuel injector control means 20 has injector signal output means 22 connected to the injector drivers of the fuel injectors 11 through 16. Injector signals from fuel injector control means 20 control the sequence and timing of fuel injector actuation, including the duration of the actuation period during which each fuel injector, in turn, is open to pass fuel from fuel rail 24. A pressure regulator 30 is provided for regulating fuel pressure within fuel supply line 26 and, therefore, in fuel rail 24. Pressure regulator 30 is located proximate to fuel pump 32. That is, it is closer to fuel pump 32 than to the fuel rail 24 and is upstream of the fuel filter 28. Locating the pressure regulator 30 proximate to the fuel pump is found to provide enhanced accuracy of pressure readings by pressure sensor means 34 mounted on fuel rail 24. The fuel pressure regulator typically is a diaphragm operated relief valve with one side of the diaphragm sensing fuel pressure and the other side subjected to intake manifold pressure. The nominal fuel pressure is established by a spring pre-load applied to the diaphragm. Referencing one side of the diaphragm to manifold pressure aids in maintaining a constant pressure drop across the injectors. Fuel in excess of that used by the engine passes through the regulator and returns to the fuel tank 33 via shunt line 31.

Suitable pressure sensor means are commercially available and include, for example, variable reluctance, differential pressure transducers. Preferably the transducer has good transient response to low frequency transient pressure waves, low frequency here meaning 1 KHz or lower. The pressure sensor means preferably also has a high output signal with low susceptibility to electrical noise and good durability to withstand vibrations and shock experienced in a motor vehicle engine environment. Employing pressure sensor means having a transducer diaphragm vented on one side to atmosphere allows gage measurement of pressure (PSIG). The output signal from the pressure transducer preferably is a continuous analog voltage out signal, where signal voltage varies directly with fuel pressure. Zero voltage can be set to the nominal fuel pressure established for the fuel rail. The pressure signal from the pressure sensor means 34 may further comprise signal conditioning means. Thus, the pressure transducer may be connected by a shielded cable to a signal conditioner. Suitable signal conditioners for various suitable pressure transducers are commercially available and will be apparent to those skilled in the art in view of the present disclosure. In accordance with such preferred embodiment, the transducer signal conditioner sources the pressure transducer with excitation power and amplifies the transducer output. The resulting pressure signal, that is, analog voltage output 35 of the pressure sensor means 34 is, therefore, proportional to fuel rail pressure sensed by the pressure transducer.

The pressure signal is input to signal processing means 37 for generating an output signal in response thereto. Signal processing means 37 can be, for example, a programmable waveform analyzer, various models of which are commercially available and will be readily apparent to those skilled in the art in view of this disclosure. Such analyzers digitize and store analog voltage signals. Typically, the signal processing means will employ a test interval equal in length to a single full engine cycle, with signal value acquisitions every 100 to 500 microseconds (μs). Thus, at an engine operating speed of 1000 RPM, for a six cylinder engine, the test interval would be 120 ms, with 240 to 1200 pressure signal value acquisitions to be processed. Those who are skilled in this technology will recognize that frequent sampling yields more accurate or reliable results when processed, e.g., to produce a frequency spectrum by Fast Fourier Transform analysis as discussed above. The signal processing means preferably is responsive to a timing signal 39 from the fuel injector control means 20 to synchronize acquisition of pressure waveforms with the actuation of the individual injectors. The delay between the sending of the actuation signal and the arrival at the pressure sensor means of the resulting transient fuel pressure waveform is readily obtained empirically for any given application of the invention (i.e., for any given engine arrangement). Those skilled in the art will recognize that such propagation delay will vary from injector to injector, depending on such factors as the distance along a fuel rail between the pressure sensor means and the individual injector.

It should be recognized that the wave form associated with a given injector actuation, as sensed by the pressure sensor means, typically comprises a complex interference pattern generated by the opening and closing events of the injector and their associates echoes propagated in the fuel rail. Without wishing to be bound by theory, it is presently understood that the wave form resulting from each individual injector actuation combines substantially linearly with the waveforms generated by proximate actuations (i.e., injector actuations occurring in close sequential order with the actuation in question). A particularly preferred embodiment of the invention involves injector diagnosis based on a waveform extraction technique now described. The hardware arrangement illustrated in the embodiment of FIG. 2 is suitable for carrying out such a waveform extraction method. In accordance with such method, the fuel injector control means is adapted to actuate the fuel injectors in a standard mode wherein all of the fuel injectors are actuated in turn in a standard engine cycle sequence. The fuel injector control means is further adapted to actuate the fuel injector in a test mode wherein actuation of each of the fuel injectors is deleted in turn from an otherwise standard engine cycle sequence. Thus, there would be a series of otherwise standard engine cycle sequences during each of which a corresponding one of the fuel injectors is not actuated to establish a corresponding test cycle sequence for each individual fuel injector. The pressure signal for actuation of a given fuel injector is then developed by the signal processing means by extracting it from the pressure signal for the standard engine cycle sequence. Specifically, the pressure signal for the test cycle sequence for the injector in question is subtracted or otherwise canceled out of the pressure signal for the standard engine cycle sequence. Because the pressure signals are found to combine substantially linearly, as mentioned above, this operation leaves a pressure signal corresponding substantially to actuation of just the injector in question. In this way, pressure signals for actuation of individual injectors are obtained while the engine is running. The signal processing means then processes the pressure signal in the manner described above, identifying any delay in pressure drop and/or pressure rise associated with actuation for each injector in turn.

Figure 3:
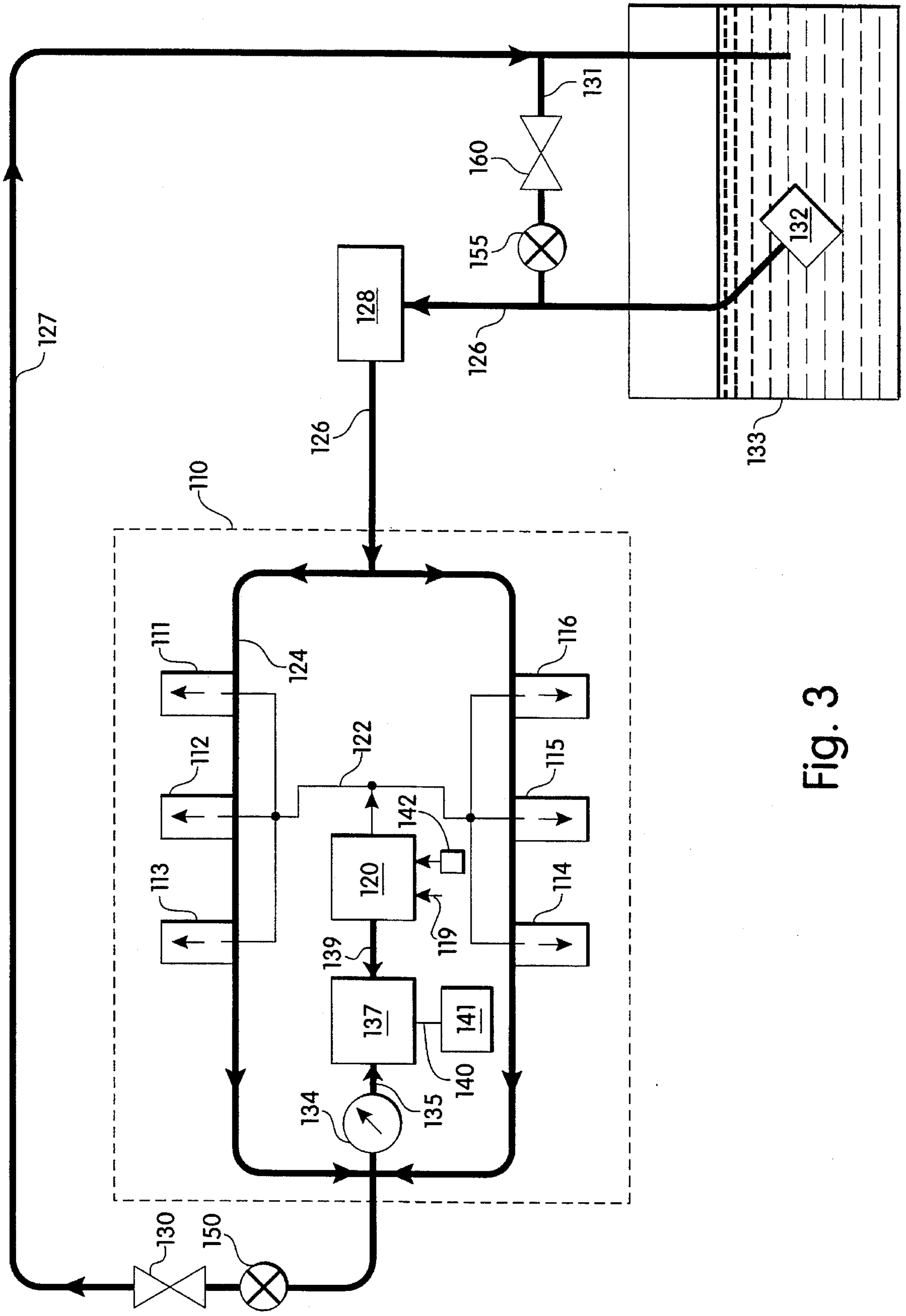
FIG. 3 is a schematic illustration of an internal combustion engine fuel system having an on-board diagnostic system for detecting fuel injector malfunction in accordance with a second embodiment of the invention.

A second preferred embodiment of the invention is schematically illustrated in FIG. 3. The embodiment of FIG. 3 involves a more traditional fuel injection supply line, in that a fuel return line is provided downstream of the fuel rail. The system is modified, however, to deadhead the system during fuel injector testing, as now described. In addition, the pressure regulator is relocated to a location proximate the fuel pump, as in the embodiment of FIG. 2. Suitable regulators are commercially available and will be apparent to those skilled in the art in view of the present disclosure. This embodiment permits fuel pressure to be adjusted to preselected production levels, as in the embodiment of FIG. 2. Locating the regulator remote from the fuel rail can provide individual injector transients in the aggregate waveform having more uniform pulse-to-pulse amplitudes and signatures.

In the embodiment of FIG. 3, fuel pump 132 is mounted in fuel tank 133 in the customary manner. Fuel is supplied during normal engine operation via supply line 126 which passes through fuel filter 128 to fuel rail 124. Fuel rail 124 feeds fuel to 6 fuel injectors 111 through 116 which are actuated by actuation signals 122 from fuel injector control means 120. As in the embodiment of FIG. 2, fuel injector control means 120 preferably is incorporated into an electronic engine control module or computer which performs various additional engine control functions.

Engine 110 in the embodiment of FIG. 3 is adapted for normal engine operation, during which actuation of the fuel injectors is not necessarily analyzed. Engine 110 also is adapted for fuel injector testing operation, during which engine operation continues while actuation of the fuel injectors is analyzed. During fuel injector testing operation, the fuel supply line is altered by appropriate valving, including first valve means 150 in the fuel return line 127 for deadheading the fuel rail during fuel injector testing operation. Specifically, during testing operation valve means 150 closes the fuel return line to fuel flow from the fuel rail. During normal engine operation valve means 150 opens the fuel return line 127 to fuel flow from the fuel rail 124. Second valve means 155 is provided in fuel shunt line 131 for closing the fuel shunt line during normal engine operation and for opening the fuel shunt line during fuel injector testing operation. Since trapped vapor can seriously degrade the frequency response of the system, the system preferably is adapted to be purged. This occurs normally in the embodiment of FIG. 3 with valve 155 closed and valve 150 open. During normal engine operation, with first valve means 150 open and second valve means 155 closed, pressure in the fuel rail is regulated by pressure regulator 130 in fuel return line 127. During testing operation, with first valve means 150 closed to deadhead the fuel rail and second valve means 155 open, pressure is regulated by pressure regulator 160 in shunt line 131.

Fuel injector diagnosis in the embodiment of FIG. 3 is carried out substantially in accordance with the various techniques discussed above. Thus, timing signal 139 is sent by fuel injector control means 120 to signal processing means 137 to trigger measurement of a propagation delay period after which the signal processing means 137 processes signal 135 from pressure sensor 134. As in the case of the embodiment of FIG. 2, the above-described waveform extraction method is preferred. The signal processing means sends output signal 140 to the fuel injector control means 120. In accordance with preferred embodiments, as discussed above, fuel injector control means 120 preferably employs memory means 142, such as a look-up table, to determine an adjustment factor, if any, for adjusting the actuation signal timing for the fuel injector in question. Additional inputs 119 may also be fed to fuel injector control means 120 for determining actuation duration, for example, inputs from exhaust gas sensors, mass airflow sensors, etc.

Optionally, the system further comprises operator signal 165 generated when the output signal indicates an impaired injector. In the case of a motor vehicle engine, such operator signal may cause illumination of an instrument panel warning light or the like. Such operator signal can alert the operator to seek repair or replacement of the injector(s).

Those skilled in the art will recognize that the subject matter disclosed herein can be modified and/or implemented in alternative embodiments without departing from the true scope and spirit of the present invention as defined by the following claims.

We claim:

1. An internal combustion engine having an on-board diagnostic system for detecting a malfunctioning fuel injector during engine operation, comprising:

fuel supply means for supplying liquid fuel under pressure to combustion cylinders of the engine, comprising at least one fuel injector operatively connected to a fuel rail;

fuel injector control means for generating a fuel injector actuation signal to actuate the fuel injector to pass fuel from the fuel rail during a controlled actuation period;

pressure sensor means for sensing transient fuel pressure waves in the fuel rail resulting from actuation of the fuel injector and for generating a corresponding pressure signal;

signal processing means operatively connected to the sensor means for processing the pressure signal to detect injector actuation delay based on said transient fuel pressure waves and for generating an output signal upon detecting actuation delay; and utilization means operatively connected to the signal processing means for receiving the output signal and manifesting its presence.

2. The internal combustion engine of claim 1 wherein the engine is a multi-cylinder four stroke engine, multiple fuel injectors are operatively connected to the fuel rail for passing fuel to the cylinders, and the pressure sensor means comprises a pressure transducer mounted to the fuel rail with a pressure responsive diaphragm exposed to fuel in the fuel rail and a signal conditioner to generate the pressure signal as a continuous analog voltage output signal.

3. The internal combustion engine of claim 2 wherein the pressure signal is generated by the pressure sensor means essentially in response to low frequency transient fuel pressure waves.

4. The internal combustion engine of claim 3 wherein the signal processing means is responsive to a timing signal generated by the fuel control means corresponding to commencement of the injector actuation signal for measuring a first actual time duration between the timing signal and a pressure signal from the pressure sensor means corresponding to a fuel line pressure drop indicative of an opening of the injector, comparing the first actual time duration to a first stored value corresponding to a non-delayed opening of the injector in response to the injector actuation signal, and generating said output signal comprising a first output signal when the first actual time duration is larger than the first stored value.

5. The internal combustion engine of claim 4 wherein the utilization means comprises actuation signal timing means for advancing commencement of the fuel injector actuation signal in response to the first output signal.

6. The internal combustion engine of claim 5 wherein the signal processing means is further responsive to a second timing signal generated by the fuel control means corresponding to termination of the injector actuation signal, for measuring a second actual time duration between the timing signal and a pressure signal corresponding to a fuel line pressure increase indicative of a closing of the injector, for comparing the second actual time duration to a second stored value corresponding to a non-delayed closing of the injector in response to termination of the injector actuation signal, and for generating said output signal comprising a second output signal, distinguishable from the first output signal by the utilization means, when the second actual time duration is larger than the second stored value.

7. The internal combustion engine of claim 6 wherein the actuation signal timing means is further for advancing termination of the fuel injector actuation signal in response to the second output signal.

8. An internal combustion engine having an on-board diagnostic system for detecting a malfunctioning fuel injector during engine operation, comprising:

fuel supply means for supplying liquid fuel under pressure to combustion cylinders of a multi-cylinder four stroke engine comprising multiple fuel injectors operatively connected to a fuel rail for passing fuel to the cylinders;

fuel injector control means for generating a fuel injector actuation signal to actuate the fuel injector to pass fuel from the fuel rail during a controlled actuation period;

pressure sensor means for sensing transient fuel pressure waves in the fuel rail resulting from actuation of the fuel injector and for generating a corresponding pressure signal essentially in response to low frequency transient fuel pressure waves, comprising a pressure transducer mounted to the fuel rail with a pressure responsive diaphragm exposed to fuel in the fuel rail and a signal conditioner to generate the pressure signal as a continuous analog voltage output signal;

signal processing means operatively connected to the sensor means for processing the pressure signal to detect injector actuation delay and for generating an output signal upon detecting actuation delay, being responsive to a timing signal generated by the fuel control means corresponding to commencement of the injector actuation signal for measuring a first actual time duration between the timing signal and a pressure signal from the pressure sensor means corresponding to a fuel line pressure drop indicative of an opening of the injector comparing the first actual time duration to a first stored value corresponding to a non-delayed opening of the injector in response to the injector actuation signal, and generating said output signal comprising a first output signal when the first actual time duration is larger than the first stored value, and a second timing signal generated by the fuel control means corresponding to termination of the injector actuation signal, for measuring a second actual time duration between the timing signal and a pressure signal corresponding to a fuel line pressure increase indicative of a closing of the injector, for comparing the second actual time duration to a second stored value corresponding to a non-delayed closing of the injector in response to termination of the injector actuation signal, and for generating said output signal comprising a second output signal, distinguishable from the first output signal by the utilization means, when the second actual time duration is larger than the second stored value; and utilization means operatively connected to the signal processing means for receiving the output signal and manifesting its presence, compromising actuation signal timing means for advancing commencement of the fuel injector actuation signal in response to the first output signal and for advancing termination of the fuel injector actuation signal in response to the second output signal, wherein:

the fuel supply means further comprises a fuel pump operatively mounted to a fuel tank, a fuel supply line for passing fuel from the fuel pump to the fuel rail, and pressure regulator means operatively mounted to the fuel supply line proximate to the fuel pump for regulating fuel pressure in the fuel rail; and the fuel injector control means is adapted to actuate the fuel injectors, during a fuel injector test period in a standard mode wherein the fuel injectors are actuated in turn in a standard engine cycle sequence, and in a test mode wherein actuation of each of the fuel injectors is deleted in turn from a corresponding one of a series of otherwise standard engine cycle sequences to provide for each fuel injector a corresponding test cycle sequence in which it was not actuated; and the pressure signal for each fuel injector is determined as the difference between the pressure signal for a standard engine cycle sequence and the pressure signal for the corresponding test cycle sequence.

9. The internal combustion engine of claim 8 wherein the signal processing means comprises a waveform analyzer.

10. The internal combustion engine of claim 9 wherein the fuel rail is deadheaded.

11. The internal combustion engine of claim 10 adapted for normal engine operation, during which fuel flow provided by the fuel injectors is not analyzed, and for fuel injector testing operation, during which engine operation continues while fuel flow provided by the fuel injectors is analyzed, wherein (i) the fuel supply line comprises a shunt line for returning excess fuel to the fuel tank, bypassing the fuel rail, said pressure regulating means being mounted in the shunt line for regulating fuel pressure in the fuel rail during the fuel injector testing operation, and (ii) the fuel supply means further comprises:

a fuel return line for returning fuel from the fuel rail to the fuel tank;

first valve means in the fuel return line for deadheading the fuel rail during fuel injector testing operation by closing the fuel return line to fuel flow from the fuel rail, and for opening the fuel return line to fuel flow from the fuel rail during normal engine operation;

second valve means in the fuel shunt line for closing the fuel shunt line during normal engine operation and for opening the fuel shunt line during fuel injector testing operation; and second pressure regulator means mounted in the fuel return line for regulating fuel pressure in the fuel rail during normal engine operation.

12. An on-board diagnostic system for detecting fuel injector malfunction in an internal combustion engine during engine operation, the engine having at least one fuel injector operatively connected to a fuel supply line, and responsive to a fuel injector actuation signal to open to pass fuel from the fuel supply line in response to commencement of the actuation signal and to close in response to termination of the actuation signal, the diagnostic system comprising:

fuel injector control means operatively connected to the fuel injector for generating the fuel injector actuation signal, a first timing signal coincident with commencement of the actuation signal, and a second timing signal coincident with termination of the actuation signal;

pressure sensor means operatively mounted to the fuel supply line for sensing transient fuel pressure waves in the fuel supply line resulting from actuation of the fuel injector, and for generating pressure signals corresponding to the transient fuel pressure waves;

signal processing means operatively connected to the pressure sensing means for receiving pressure signals from the pressure sensor means and operatively connected to the fuel injector control means for receiving the first and second timing signals for determining a first actual time duration between the first timing signal and receipt of a first pressure signal corresponding to a pressure drop in the fuel supply line corresponding to opening of the injector, for comparing the first actual time duration to a first stored value corresponding to non-delayed opening of the injector, and for generating a first output signal based thereon, and for determining a second actual time duration between the second timing signal and receipt of a second pressure signal corresponding to a pressure rise in the fuel supply line corresponding to closing of the injector, for comparing the second actual time duration to a second stored value corresponding to non-delayed closing of the injector, and for generating a second output signal based thereon; and utilization means operatively connected to the signal processing means and the fuel injector control means for receiving the first output signal and the second output signal and manifesting their presence, including generating an actuation timing adjustment signal to the fuel injector control means to advance the fuel injector actuation signal.

13. An on-board diagnostic system for detecting fuel injector malfunction in an internal combustion engine during engine operation, the engine having at least one fuel injector operatively connected to a fuel supply line, and responsive to a fuel injector actuation signal to open to pass fuel from the fuel supply line in response to commencement of the actuation signal and to close in response to termination of the actuation signal, the diagnostic system comprising:

fuel injector control means operatively connected to the fuel injector for generating the fuel injector actuation signal, a first timing signal coincident with commencement of the actuation signal, and a second timing signal coincident with termination of the actuation signal;

pressure sensor means operatively mounted to the fuel supply line for sensing transient fuel pressure waves in the fuel supply line resulting from actuation of the fuel injector, and for generating pressure signals corresponding to the transient fuel pressure waves;

signal processing means operatively connected to the pressure sensing means for receiving pressure signals from the pressure sensor means and operatively connected to the fuel injector control means for receiving the first and second timing signals for determining a first actual time duration between the first timing signal and receipt of a first pressure signal corresponding to a pressure drop in the fuel supply line corresponding to opening of the injector, for comparing the first actual time duration to a first stored value corresponding to non-delayed opening of the injector substantially equal to a wave propagation delay period for a pressure signal to travel from the injector to the pressure sensor means plus a threshold delay period of 0.25 to 0.75 ms., and for generating a first output signal based thereon, and for determining a second actual time duration between the second timing signal and receipt of a second pressure signal corresponding to a pressure rise in the fuel supply line corresponding to closing of the injector, for comparing the second actual time duration to a second stored value corresponding to non-delayed closing of the injector, and for generating a second output signal based thereon; and utilization means operatively connected to the signal processing means and the fuel injector control means for receiving the first output signal and the second output signal and manifesting their presence, including generating an actuation timing adjustment signal to the fuel injector control means to advance the fuel injector actuation signal.

14. The on-board diagnostic system of claim 13 wherein said first output signal is generated when the first actual time duration is more than said wave propagation delay period.

15. The on-board diagnostic system of claim 14 wherein said first output signal further comprises an indicator signal generated when the first actuation time duration exceeds the first stored value, and the utilization means comprises an indicator lamp which is illuminated in response to the indicator signal.

16. The on-board diagnostic system of claim 15 wherein the second stored value is substantially equal to the wave propagation delay period plus a threshold delay period and the second output signal is generated when the second actual time duration is more than the wave propagation delay period.

17. The on-board diagnostic system of claim 16 wherein the second output signal further comprises said indicator signal when the second actual time duration exceeds the second stored value.

* * * * *